United States Patent [19]
Ejiri et al.

[11] Patent Number: 5,341,728
[45] Date of Patent: Aug. 30, 1994

[54] ALARM DEVICE FOR TELLING END-OF-COOKING TIMING

[75] Inventors: Susumu Ejiri, Toyoake; Hajime Hiraoka, Aichi, both of Japan

[73] Assignee: Paloma Kogyo Kabushiki Kaisha, Nagoya, Japan

[21] Appl. No.: 26,535

[22] Filed: Mar. 4, 1993

[30] Foreign Application Priority Data

Mar. 9, 1992 [JP] Japan ................... 4-021322

[51] Int. Cl.$^5$ ............................... A47J 37/12
[52] U.S. Cl. ............................. 99/336; 99/330; 99/344; 126/391
[58] Field of Search .............. 99/330, 344, 342, 336; 126/391; 431/1; 122/504.2

[56] References Cited

U.S. PATENT DOCUMENTS

| | | | |
|---|---|---|---|
| 4,785,725 | 11/1988 | Tate et al. | 99/344 |
| 5,096,116 | 3/1992 | Akamatu et al. | 99/331 |

FOREIGN PATENT DOCUMENTS 62-60526  3/1987  Japan .

*Primary Examiner*—Timothy F. Simone
*Assistant Examiner*—Reginald L. Alexander
*Attorney, Agent, or Firm*—Lahive & Cockfield

[57] ABSTRACT

The present invention provides an improved alarm device which automatically starts accumulation of a heating amount when food items are placed into a cooking liquid and outputs an end-of-cooking signal when the accumulated heating amount reaches a predetermined value. This system makes an operator free from troublesome manual operation as pressing a start pad simultaneously with placing food items into the cooking liquid. The alarm device controls a cooker to start forcible heating irrespectively of its combustion conditions simultaneously with starting accumulation of the heating amount. The system of the invention prevents an undesirable time lag between substantial drop in temperature of the cooking liquid and start of heating and efficiently reduces the temperature fall due to cold food items, thus allowing food items to be cooked desirably.

13 Claims, 2 Drawing Sheets

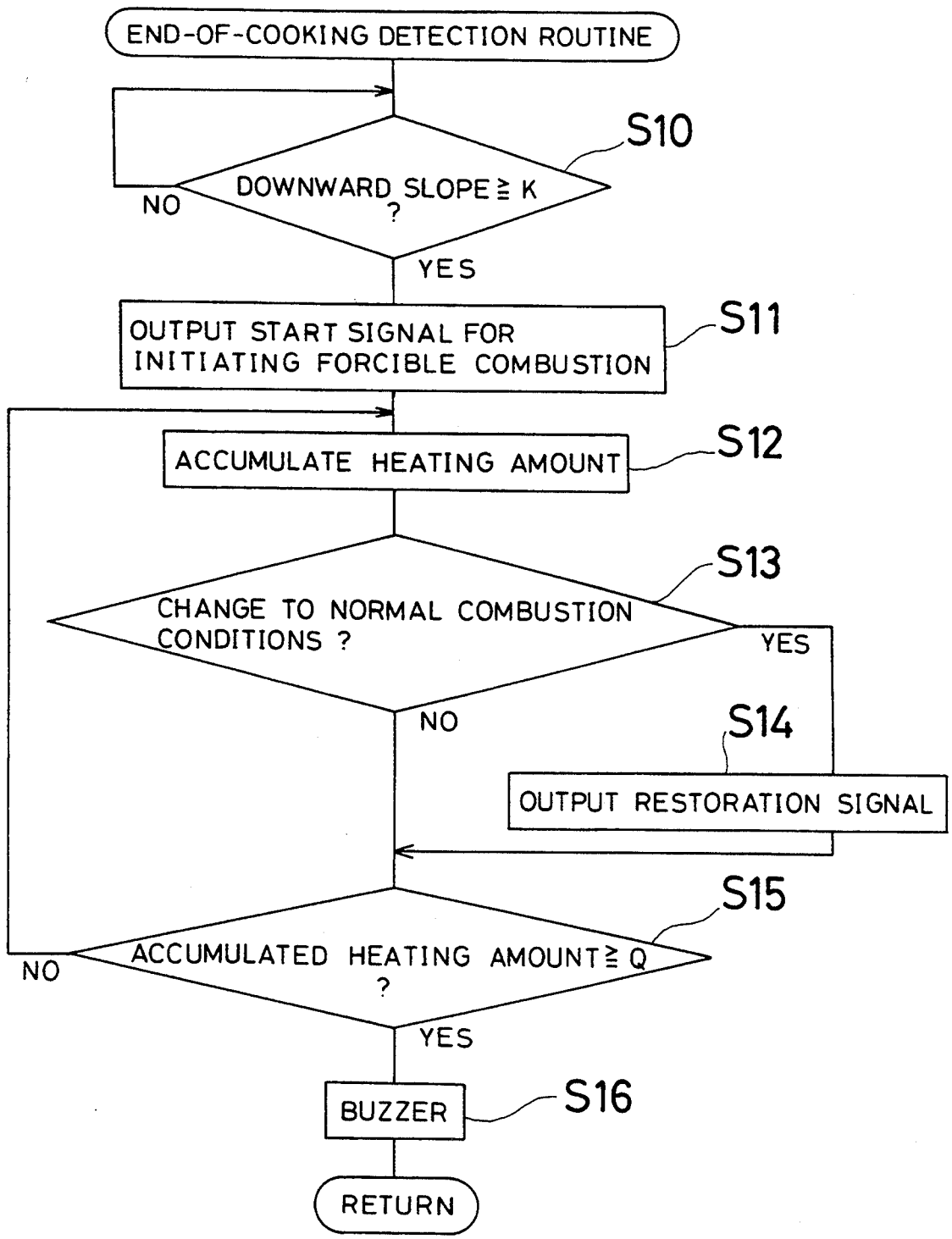

ALARM DEVICE FOR TELLING END-OF-COOKING TIMING

BACKGROUND OF THE INVENTION

1. Field of the Invention

The present invention relates to an alarm device for informing an operator of the appropriate end-of-cooking timing of certain food items. The alarm device is generally used in a cooker for cooking food items in cooking liquid such as oil or water.

2. Description of the Related Art

In cooking apparatus such as fryer apparatus and noodle cookers for cooking food items in a cooking liquid medium, determination of the appropriate heating amount is required for desirable cooking of food items. A generally used alarm device accumulates the heating amount and informs the operator with a buzzer of the appropriate end-of-cooking timing when the accumulated value reaches a predetermined limit. For example, in a fryer apparatus, the operator presses a start pad on the alarm device to initiate the accumulation of heating amount simultaneously when food items are placed into cooking oil whose temperature is maintained in a fixed range. When the heating amount reaches a predetermined value, the buzzer tells the operator the end-of-cooking timing when the food items are to be taken out of a frypot in the fryer apparatus.

Such a conventional alarm device requires the operator to press the start pad simultaneously with placing food items into a cooking liquid. This manual operation is relatively troublesome. Moreover, when the operator forgets to press the start pad, the alarm device does not inform the operator of the appropriate timing for taking food items out of the cooking liquid. This may cause over-cooking of the food items and damage their taste and flavor.

In the conventional fryer apparatus, combustion is controlled ON and OFF to maintaining the oil temperature within a predetermined range. When food items are placed into the cooking liquid under the combustion OFF conditions, the fryer apparatus can not resume combustion immediately, but there is a certain time delay before re-start of combustion. This time lag is generally attributed to the temperature sensor which detects the drop in oil temperature below a predetermined value after some delay due to the uneven temperature distribution in cooking oil and convection of the oil in the frypot. The conventional system resumes combustion after the temperature in cooking oil around the cold food items falls undesirably, which may cause underdoing or overdoing of food items.

SUMMARY OF THE INVENTION

One object of the invention is to provide a novel alarm device for informing the operator of the end-of-cooking timing.

Another object of the invention is to improve usability of the alarm device which works without troublesome manual operation, that is, without pressing a start pad simultaneously with placing food items into a cooking liquid medium.

A still another object of the invention is to minimize a time lag between placing food items into a cooking liquid medium and start of heating.

A further object of the invention is to provide an improved alarm device which minimizes the abrupt temperature drop of the cooking liquid medium.

The above and other related objects are realized by an alarm device of the invention for informing an operator of an end-of-cooking timing, which is applied to a cooker heating and cooking food items in a cooking liquid medium. The alarm device of the invention includes: a temperature detecting unit for detecting temperature of the cooking liquid medium; an accumulation unit for accumulating a heating amount based on the temperature detected by the temperature detecting unit and a heating time; an alarm unit for informing an operator of an end-of-cooking timing when the heating amount accumulated by the accumulation unit reaches a predetermined value; a slope comparing unit for comparing a downward slope in the detected temperature of the cooking liquid medium with a predetermined limit; and a first control unit for controlling the accumulation unit to initiate accumulation of a heating amount when the downward slope becomes equal to or greater than the predetermined limit.

In the alarm device of the invention, the accumulation unit accumulates a heating amount based on the temperature of a cooking liquid medium detected by the temperature detecting unit and a heating time. The alarm unit informs the operator of the end-of-cooking timing when the accumulated value reaches a predetermined value. Accumulation of the heating amount starts in the following manner. When food items are placed into the cooking liquid medium, the temperature of the liquid medium abruptly drops due to the cold food items. When the temperature of the liquid medium falls steeply, or more specifically when the downward slope detected by the slope comparing unit becomes equal to or greater than a predetermined limit, the first control unit controls the accumulation unit to start accumulation of the heating amount. This system of the invention automatically detects presence of food items in the cooking liquid medium and starts accumulation of the heating amount, thus making the operator free from the troublesome manual operation as pressing a start pad.

The alarm device of the invention may further include a second control unit for controlling the cooker to start forcible heating of the cooking liquid medium irrespective of the temperature control conditions of the cooker, when the accumulation unit starts accumulating the heating amount.

The second control unit controls the cooker to start forcible combustion irrespective of the temperature control conditions of the cooker when accumulation of the heating amount is started or when presence of food items in the cooking liquid medium is detected. The cooker forcibly starts combustion regardless of a delay in detection of the temperature drop by the temperature detecting unit due to the response characteristics of the detecting unit and the uneven temperature distribution of the cooking liquid medium. This structure of the invention prevents an undesirable time lag between substantial drop in temperature and start of heating and efficiently reduces the temperature fall due to cold food items, thus allowing food items to be cooked desirably.

These and other objects, features, aspects, and advantages of the present invention will become more apparent from the following detailed description of the preferred embodiment with the accompanying drawings.

BRIEF DESCRIPTION OF THE DRAWINGS

FIG. 2 is a flowchart showing an end-of-cooking timing detection routine.

DESCRIPTION OF THE PREFERRED EMBODIMENT

Figure 1:
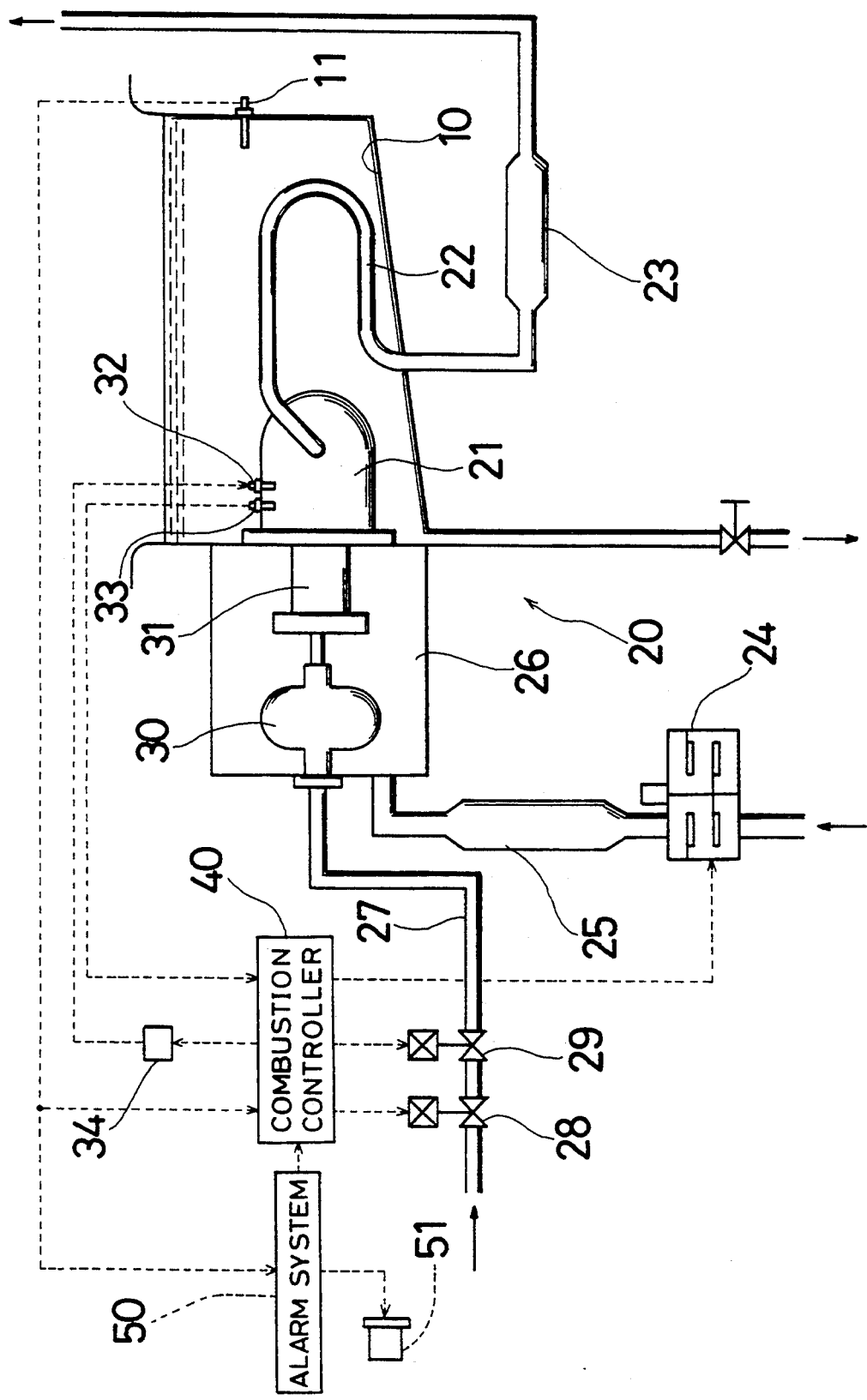
FIG. 1 is a view schematically illustrating a fryer apparatus embodying the invention.

FIG. 1 is a schematic view illustrating a fryer apparatus including an alarm device for informing the operator of the appropriate end-of-cooking timing as an embodiment of the invention. Although the alarm device is incorporated in the fryer apparatus in the embodiment, it may externally be attached to the fryer apparatus according to the requirements. The fryer apparatus of the embodiment used for cooking or deep fat frying of food items such as french fries or breaded chickens includes: a frypot 10 which is filled with cooking liquid or oil; a pulse combustor 20 for heating the cooking oil in the frypot 10; a combustion controller 40 for controlling combustion of the pulse combustor 20; and an alarm device 50 for accumulating the heating amount and informing the operator of the appropriate end-of-cooking timing.

The pulse combustor 20 in the fryer apparatus has a combustion-exhaust system, an air supply system, and a fuel gas supply system.

The combustion-exhaust system includes: a combustion chamber 21 disposed in the frypot 10 for pulse combustion; a tail pipe 22 winding its way through the frypot 10 and constituting an exhaust conduit of hot combustion byproducts from the combustion chamber 21; and an exhaust muffler 23 formed in the middle of the tail pipe 22. The cooking oil in the frypot 10 is heated by thermal energy transmitted through the outside walls of the combustion chamber 21 and the tail pipe 22. A temperature sensor 11 for detecting the temperature of the cooking oil in the frypot 10 is attached to the side wall of the frypot 10.

The air supply system for supplying air to the combustion chamber 21 includes: a fan 24 for feeding the air for combustion; an intake muffler 25 connected to the fan 24; and an air chamber 26 coupled to the combustion chamber 21 for receiving the air fed through the intake muffler 25.

The fuel gas supply system includes: first and second electromagnetic valves 28 and 29 mounted in the middle of a gas conduit 27 for opening and closing a flow path of fuel gas; and a gas chamber 30 disposed in the air chamber 26.

In the air chamber 26, there is a mixing chamber 31 coupled with and connected to the gas chamber 30. The fuel gas is supplied into the mixing chamber 31 via the gas chamber 30 while the air being supplied thereto via the air chamber 26. The separately supplied fuel gas and air are mixed in the mixing chamber 31 and transmitted to the combustion chamber 21 as an air/fuel mixture. The combustion chamber 21 is provided with an ignition plug 32 for igniting the air/fuel mixture on the commencement of combustion, and a flame rod 33 for detecting the flame.

The pulse combustor 20 thus constructed repeats explosion and combustion at a fixed cycle by taking advantage of its automatic ignition and absorption characteristics at stationary combustion. In the embodiment, a pair of check valves or flapper valves (not shown) are attached to the respective inlets of the fuel gas and the air to the mixing chamber 31 so as to prevent back flow of combustion exhaust into the fuel gas supply system and the air supply system.

The combustion controller 40 for controlling combustion of the pulse combustor 20 is constructed as a microcomputer including: a conventional arithmetic/logic/operation circuit consisting of a CPU or central processing unit, a ROM or reading only memory, and a RAM or random access memory, an input interface for inputting signals sent from the temperature sensor 11 and the flame rod 33, and an output interface for outputting control signals to the first and second electromagnetic valves 28 and 29, the fan 24, and an igniter 34. None of these elements are shown in the drawing of FIG. 1.

The combustion controller 40 starts and stops Combustion (controls ON and OFF the combustion) to maintain the temperature of cooking oil in a predetermined range. In this preferred embodiment, combustion starts when the temperature on the temperature sensor 11 falls below 180° C., and combustion stops when the temperature rises over 182° C. The temperature of the cooking oil is thus efficiently maintained in a range between 180° C. and 182° C. Food items held on a food basket (not shown) are placed and deep fried in the cooking oil which is heated and maintained in the above predetermined range.

The alarm device 50 is, like the combustion controller 40, constructed as a micro-computer constituting an arithmetic/logic/operation circuit. The alarm device 50 is connected to the temperature sensor 11 and a buzzer 51 for actually informing the operator of the end-of-cooking timing. The alarm device 50 also outputs a control signal for initiating forcible combustion to the combustion controller 40.

An end-of-cooking timing detection routine executed by the alarm device 50 is described according to the flowchart of FIG. 2. Along with this end-of-cooking timing detection routine by the alarm device 50, the temperature sensor 11 detects the temperature of cooking oil and the combustion controller 40 executes a combustion control routine.

When the power of the fryer apparatus is on to start this routine, the alarm device 50 waits until the temperature of cooking oil detected by the temperature sensor 11 at a fixed cycle abruptly drops, more concretely until the downward slope or rate of change (degree/second) in oil temperature becomes equal to or greater than a predetermined slope K (step S10). When no food items are placed in cooking oil, the oil temperature gradually increases or decreases corresponding to the ON/OFF control of the combustion controller 40. Under such conditions, the answer is consistently NO at step S10. When food items are placed in cooking oil, on the contrary, the oil temperature abruptly drops due to the cold food items, and the downward slope in oil temperature becomes equal to or greater than the predetermined slope K (degree/second). Here the answer at the determination point S10 changes to YES. In this manner, the alarm device 50 automatically detects placing food items in cooking oil.

The program then proceeds to step S11 at which the alarm device 50 outputs a control signal for initiating forcible combustion to the combustion controller 40, and subsequently to step S12 at which the alarm device 50 starts accumulation of the heating amount.

Since the food items are placed into cooking oil at any desirable time as long as the oil temperature is maintained in a predetermined range as described above, the pulse combustor 20 may be OFF according to the instruction of the combustion controller 40. In this case, the pulse combustor 20 should resume combustion as soon as possible to prevent the undesirable drop in the oil temperature due to the cold food items. There is, however, a certain time lag between substantial drop in oil temperature and start of heating because of convection of oil and uneven temperature distribution. In other words, the temperature sensor 11 detects the drop of oil temperature below the predetermined range after some delay.

In the embodiment, to overcome this drawback of the conventional system, when detecting for the existence of food items in cooking oil, the alarm device 50 outputs the control signal to the combustion controller 40 to initiate combustion forcibly irrespective of the combustion conditions of the pulse combustor 20. The pulse combustor 20 is thus forcibly driven to resume or continue combustion without a response delay which the conventional system has. This improvement reduces the undesirable temperature fall due to the delay of response.

At step S12, the heating amount is accumulated as an integral of oil temperature over time which is obtained through repetitive processing of steps S12 through S15. The heating amount thus accumulated depends upon the oil temperature. The accumulated value for a certain time period is greater in the higher oil temperature than in relatively low temperature.

After initiating forcible combustion at step S11, the program proceeds to step S13 at which the alarm device 50 determines whether the combustion conditions should change to normal ON/OFF control. When the answer is YES at step S13, the program goes to step S14 at which the alarm device 50 outputs a restoration signal for resuming ON/OFF control to the combustion controller 40. This restoration timing may be set as, for example, when a fixed time has elapsed since the start of forcible combustion, or when the temperature in the temperature sensor 11 becomes lower than a predetermined value (for example, 180° C.).

The program then proceeds to step S15 at which the heating amount accumulated at step S12 is compared with a preset heating amount Q. The processing of steps S12 through S15 are repetitively executed until the accumulated heating amount reaches the optimum preset value Q for desirable cooking of the food items. When the heating amount reaches the preset value Q, the program goes to step S16 at which the buzzer 51 informs the operator of the end-of-cooking timing when the food items are to be taken out of the cooking oil. The program initiates all variables including the accumulated value and returns to step S10.

As described above, the fryer apparatus of the embodiment detects presence of food items in cooking oil based on the downward slope of the oil temperature, and informs the operator of the appropriate end-of-cooking timing according to the heating amount accumulated after the detection. The structure of the embodiment makes the operator free from troublesome manual operation as pressing a start pad simultaneously with placing food items into cooking oil, and is thus favorably used by any operators. Whenever detecting presence of food items in cooking oil, the alarm device of the embodiment outputs a control signal to the combustion controller to initiate forcible combustion irrespective of the combustion conditions of the pulse combustor 20. This forcible combustion system prevents an undesirable time lag between substantial drop in oil temperature and start of heating and efficiently reduces the temperature fall due to cold food items, thus allowing food items to be cooked desirably. The system also changes the heating conditions from forcible combustion to normal ON/OFF control at a predetermined timing, thus effectively preventing over-heat of cooking oil.

Since there may be many modifications, alterations, and changes without departing from the scope or spirit of essential characteristics of the invention, it is clearly understood that the above embodiment is only illustrative and not restrictive in any sense. For example, the alarm device is applied to the fryer apparatus including a pulse combustor as a heat source in the embodiment, it may be applied to various cooking apparatus and cookers with Bunsen burners or electric heaters. The alarm device is incorporated in the fryer apparatus in the embodiment, but a separate alarm device may be attached to the cooker, or the combustion controller may have functions of the alarm device.

What is claimed is:

1. An alarm device for informing an operator of an end-of-cooking timing, which is applied to a cooker for cooking food items in a cooking medium,
   said alarm device comprising
   temperature detecting means for detecting temperature of said cooking medium,
   accumulation means for accumulating a selected heating amount based on the temperature detected by said temperature detecting means and a heating time,
   alarm means for informing said operator of said end-of-cooking timing when said heating amount accumulated by said accumulation means reaches a predetermined value,
   slope comparing means for comparing a downward slope in the detected temperature of said cooking with a predetermined limit, and
   first control means for controlling said accumulation means to initiate accumulation of a heating amount when said downward slope becomes equal to or greater than said predetermined limit.

2. An alarm device in accordance with claim 1, further comprising second control means for controlling said cooker to start forcible heating of said cooking medium irrespective of the temperature control conditions of said cooker when said accumulation means starts accumulating said selected heating amount.

3. An alarm device in accordance with claim 2, further comprising restoration means for controlling said cooker to stop forcible heating, thereby resuming normal heating conditions.

4. In a cooker for cooking food items in a cooking medium, said cooker including a pot filled with said cooking liquid medium, a heat source for heating said cooking medium, controlling means for controlling said heat source, and an alarm device for informing an operator of an end-of-cooking timing,
   said alarm device comprising
   temperature detecting means for detecting temperature of said cooking medium,
   accumulation means for accumulating a heating amount based on the temperature detected by said temperature detecting means and a heating time, slope comparing means for comparing a downward slope in the detected temperature of said cooking medium with a predetermined limit, accumulation control means for controlling said accumulation means to initiate accumulation of a heating amount when said downward slope becomes equal to or greater than said predetermined limit, and alarm means for informing said operator of said end-of-cooking timing when said heating amount accumulated by said accumulation means reaches a predetermined value.

5. In a cooker according to claim 4, said alarm device further comprising first signal output means for outputting a first control signal to said controlling means of said cooker to start forcible heating of said cooking medium irrespective of the temperature control conditions of said heat source of said cooker when said accumulation means starts accumulating said heating amount.

6. In a cooker according to claim 5, said alarm device further comprising second signal output means for outputting a second control signal to said controlling means of said cooker to stop forcible heating and resume normal heating conditions.

7. In a fryer apparatus for deep frying food items in cooking oil, said fryer apparatus including a frypot filled with said cooking oil, a pulse combustor for heating said cooking oil in said frypot, combustion controlling means for controlling said pulse combustor, and an alarm device for informing an operator of an end-of-cooking timing, said alarm device comprising temperature detecting means for detecting temperature of said cooking oil, accumulation means for accumulating a heating amount based on the temperature detected by said temperature detecting means and a heating time, slope comparing means for comparing a downward slope in the detected temperature of said cooking oil with a predetermined limit, accumulation control means for controlling said accumulation means to initiate accumulation of a heating amount when said downward slope becomes equal to or greater than said predetermined limit, and alarm means for informing said operator of said end-of-cooking timing when said heating amount accumulated by said accumulation means reaches a predetermined value.

8. In a fryer apparatus according to claim 7, said alarm device further comprising first signal output means for outputting a first control signal to said combustion controlling means of said fryer apparatus to start forcible combustion irrespective of the combustion conditions of said fryer apparatus when said accumulation means starts accumulating said heating amount.

9. In a fryer apparatus according to claim 8, said alarm device further comprising second signal output means for outputting a second control signal to said combustion controlling means of said fryer apparatus to stop forcible heating and resume normal combustion conditions.

10. A cooking apparatus having a frypot containing a cooking medium and a pulse combustor for heating said cooking medium, said apparatus including an alarm device for determining a heating time for food products heated in said cooking medium, said alarm device comprising temperature sensor means for monitoring the temperature of said cooking medium, heat accumulation means coupled to said temperature sensor means for accumulating heat to a selected mount, said selected mount being based upon said temperature detected by said temperature sensor means and a selected heating time, alarm means coupled to said heat accumulation means for generating a cooking completion signal when said heat accumulated by said heat accumulation means attains said selected amount, and temperature slope comparator means coupled to said temperature sensor means for comparing a rate of change of said temperature of said cooking medium measured by said temperature sensor means with a predetermined value.

11. A cooking apparatus according to claim 10 further comprising first control means for actuating said heat accumulation means when said temperature rate of change is equal to or greater than said predetermined value.

12. A cooking apparatus according to claim 10 further comprising combustion controller means for maintaining the temperature of said cooking medium within a predetermined range by disposing said pulse combustor between an ON mode, where heat from said pulse combustor is supplied to said cooking medium when said cooking medium temperature falls outside of said predetermined range, and an OFF mode, where said pulse combustor stops supplying heat to said cooking medium, and second control means for disposing said combustion controller in said ON mode, irrespective of said combustion controller means mode, when said rate of change of said temperature of said cooking medium is equal to or greater than said predetermined value.

13. A cooking apparatus according to claim 12 further comprising restoration means for generating a restoration signal for allowing said combustion controller means to dispose said pulse combustor between said ON mode and said OFF mode.

* * * * *